(12) United States Patent
Eichenlaub

(10) Patent No.: US 8,189,129 B2
(45) Date of Patent: May 29, 2012

(54) BACKLIGHTING SYSTEM FOR A 2D/3D AUTOSTEREOSCOPIC MULTIVIEW DISPLAY

(75) Inventor: Jesse B. Eichenlaub, Penfield, NY (US)

(73) Assignee: Dimension Technologies, Inc., Rochester, NY (US)

( * ) Notice: Subject to any disclaimer, the term of this patent is extended or adjusted under 35 U.S.C. 154(b) by 386 days.

(21) Appl. No.: 12/613,946

(22) Filed: Nov. 6, 2009

(65) Prior Publication Data

US 2010/0118218 A1 May 13, 2010

Related U.S. Application Data

(60) Provisional application No. 61/112,424, filed on Nov. 7, 2008.

(51) Int. Cl.
*G02F 1/1335* (2006.01)
*G09F 13/04* (2006.01)

(52) U.S. Cl. .............. 349/15; 349/62; 362/97.1

(58) Field of Classification Search .......... 349/15, 349/57, 56, 61, 62, 64, 65, 95, 112, 139, 349/142, 144, 145; 362/97.1, 97.2, 97.3, 362/97.4

See application file for complete search history.

(56) References Cited

U.S. PATENT DOCUMENTS

| | | | |
|---|---|---|---|
| 4,717,949 A | 1/1988 | Eichenlaub | |
| 4,829,365 A | 5/1989 | Eichenlaub | |
| 5,410,345 A | 4/1995 | Eichenlaub | |
| 6,064,424 A | 5/2000 | van Berkel et al. | |
| 6,157,424 A | 12/2000 | Eichenlaub | |
| 7,046,271 B2 | 5/2006 | Doerfel et al. | |
| 7,321,343 B2 | 1/2008 | Klippstein et al. | |
| 2006/0221270 A1* | 10/2006 | Ioki et al. | 349/61 |
| 2007/0109811 A1 | 5/2007 | Krijn et al. | |
| 2010/0118218 A1* | 5/2010 | Eichenlaub | 349/15 |

OTHER PUBLICATIONS

Holliman, Nick. "3D Display Systems" Department of Computer Science, University of Durham, Feb. 2, 2005.
International Search Report and Written Opinion for International Application No. PCT/US2009/063558. Issued on Jun. 21, 2010.

* cited by examiner

Primary Examiner — Brian Healy
(74) Attorney, Agent, or Firm — Brown & Michaels, PC

(57) ABSTRACT

The backlight system of the invention creates illumination behind a liquid crystal or other transparent display. In one mode of operation it produces a series of precise, thin slanted lines with dark space in between which are used to make multiple perspective views, displayed simultaneously on the LCD, visible from a series of horizontally spaced viewing zones spaced in front of the display. In another mode of operation, it produces even diffuse illumination similar to that generated by conventional backlights, allowing the LCD to display conventional 2D images.

40 Claims, 17 Drawing Sheets

Figure 10a

| V1 | V2 | V3 |
|---|---|---|
| V4 | V5 | V6 |
| V7 | V8 | V9 |

Figure 13a
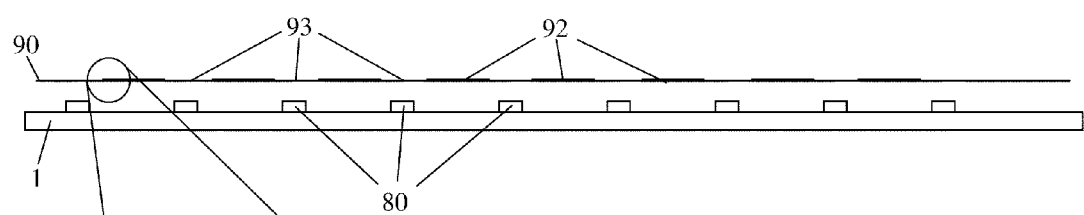
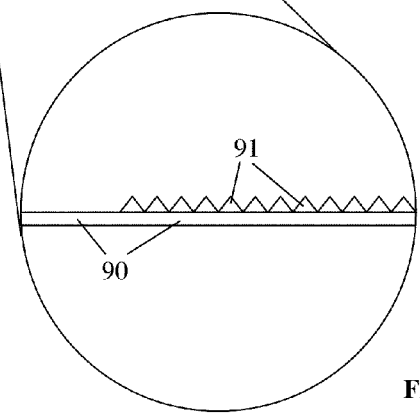
Figure 13b

BACKLIGHTING SYSTEM FOR A 2D/3D AUTOSTEREOSCOPIC MULTIVIEW DISPLAY

REFERENCE TO RELATED APPLICATIONS

This application claims one or more inventions which were disclosed in Provisional Application No. 60/112,424, filed Nov. 7, 2008, entitled "BACKLIGHTING SYSTEM FOR A 2D/3D AUTOSTEREOSCOPIC MULTIVIEW DISPLAY". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of backlights for displays. More particularly, the invention pertains to backlight systems for liquid crystal (LCD) or other displays.

2. Description of Related Art

U.S. Pat. No. 5,410,345 "Stroboscopic Illumination System for Video Displays" discloses a backlighting system for video displays. It uses a number of vertically oriented parallel light sources (such as fluorescent tubes) spaced behind a lenticular lens, which creates up to hundreds of images of the light sources on a diffuser situated behind an LCD. The light lines are spaced apart from each other and from the LCD such that, combined with information presented on the pixels of the LCD, they serve to produce two or more separate images which are visible from different regions of space called "viewing zones" situated in front of the display. A person sitting within certain areas in front of the display will have one eye in one viewing zone and the other eye in another. The images visible within the different viewing zones will be different perspective views of a 3D scenes, and the person will perceive and image with depth. The aforementioned patent is incorporated herein by reference.

A detailed description of the manner in which light lines and images displayed using the pixels of an LCD produce 3D images is explained in detail in U.S. Pat. No. 4,717,949 "Autostereoscopic Display with Illuminating Lines and Light Valve", which is incorporated herein by reference.

For further discussion of multiview autostereoscopic 3D displays, and how the 3D effect is produced by means of light emitting lines which in turn produce multiple horizontally spaced viewing zones, and various possible configurations of such displays see U.S. Pat. Nos. 4,829,365 and 5,410,245, assigned to the same assignee as the present invention, and which are incorporated herein by reference.

In such displays a series of thin, vertical light emitting lines with dark space in between is generated behind the columns of pixel elements of an LCD. The light lines are spaced apart from one another and from the LCD at such distances that, to an observer situated near an optimum viewing plane at a certain distance in front of the LCD, the lines will be seen through only certain sets of pixel columns by one eye, and, due to the difference in eye position, through an entirely different set of pixel columns by the other eye. Only dark space will be seen behind the remaining columns from those positions. Each eye thus sees the image information displayed on different sets of columns.

Different perspective views of a scene are displayed on different columns such that each eye, seeing a different perspective of the scene, perceives an image with apparent depth. Furthermore, since different perspective views can be displayed on different columns, the image can be made to change perspective like a real scene would as the observer moves around and sees the light lines through different columns of pixels; i.e. the observer can look around behind objects etc.

A characteristic of systems as described in the U.S. Pat. Nos. 4,717,949, 4,829,365, and 5,410,345 is that in the multiview configurations, in which one light of light is produced for every N columns of pixels, the 3D images possess a total resolution that is 1/N times the resolution of the LCD that is used to display them, since the available pixels in the LCD must be split between the N different perspective views that make up the 3D image. Furthermore, the resolution lost in 3D mode is all lost in the horizontal direction. Given a 3D image made up of N perspective views, and given an LCD with X×Y resolution, the resolution of the 3D images perceived by the observer is (X/N)×Y. In a typical multiview display where N may be on the order of 5 to 9, this mismatch in resolution between horizontal and vertical produces on obvious and undesirable "looking through a picket fence" effect.

Given a number of perspective views N, the 2D images used to create the 3D image will have a total resolution of 1/N times the resolution of the LCD, because the pixels of the LCD must be divided between the N multiple images. It is desirable that the resolution loss N be divided between the horizontal and vertical directions, and furthermore, it appears to be most advantageous to divide it equally between the horizontal and vertical directions. In such a case picket fence effects are avoided.

Various autostereoscopic display vendors, in particular Phillips and X3D, have achieved this equal resolution loss in both directions by placing tilted optical elements in front of LCD or plasma displays. Phillips uses lenticular lenses; X3D uses stair step patterns of slits in an opaque barrier in combination with color filters. All of these displays use optical elements that are tilted at a 3:1 slope angle (3 down, 1 over), so each one passes in front of successive pixel elements in different rows of pixels along a diagonal of those elements, instead of along a single vertical column. Explanations of how these displays are constructed and how they operate are found in U.S. Pat. No. 6,064,424 (Phillips) and U.S. Pat. Nos. 7,046,271, and 7,321,343 (X3D).

Each pixel of an LCD typically consists of three separate elements, a red element, a green element, and a blue element. Each of these elements is typically three times as high as it is wide, so that the three together, side by side, make up a square pixel. Since the square pixels are typically arranged in straight vertical columns, all of the red, green, and blue elements in each column line up to form red, green, and blue stripes running from the top of the display to the bottom. Thus a slanted lenticular lens, like Phillips uses, or a slanted barrier and color filter pattern, as X3D uses, or slanted light lines, as is described in this disclosure, that are angled to pass in front of the corner points of a group of pixel elements situated along a diagonal, will have a slope angle of 3:1, that is, the line will travel three units down for every unit to the side. In other words, the lines or lenses will make angles of 18.435 degrees to the vertical.

Instead of arranging the picture information from the different perspective views on different columns of pixel elements, these types of displays arrange the information from different perspective views onto different diagonal lines of pixel elements.

SUMMARY OF THE INVENTION

The backlight system of the invention creates illumination behind a liquid crystal or other transparent display. In a 3D mode of operation it produces a series of precise, thin slanted lines with dark space in between which are used to make multiple perspective views, displayed simultaneously on the LCD, visible from a series of horizontally spaced viewing zones spaced in front of the display. In another 2D mode of operation, it produces even diffuse illumination similar to that generated by conventional backlights, allowing the LCD to display conventional 2D images.

BRIEF DESCRIPTION OF THE DRAWING

FIG. 10a illustrates the manner in which the information within nine perspective views is mapped onto an electronic image file for use with the invention.

FIG. 10b is a detail of how information from FIG. 10a. is displayed on the LCD.

FIG. 13a is a side view of the brightness enhancing film and light source configuration shown in FIG. 12.

FIG. 13b is a magnified side view of the brightness enhancing film shown in FIG. 13a.

FIG. 16b shows a cross-section of a reflector from FIG. 16a.

FIG. 17b shows a display using the material of FIG. 17a.

DETAILED DESCRIPTION OF THE INVENTION

The backlight of the invention produces the effect of producing multiview autostereoscopic image whose resolution loss is divided between the horizontal and vertical directions by generating light emitting lines behind the LCD that are tilted at a 3:1 slope angle, in other words at an angle of 18.435 degrees to the vertical. The light lines are situated behind the pixels of the LCD, on which are displayed image information from N different perspective view images on diagonal lines of pixel elements like those shown in FIGS. 10a-10b (which is described in more detail below).

The light emitting lines are produced by means of a light source that emits light from large lines of light sources tilted at a 3:1 slope angle (18.435 degrees from the vertical) in combination with a lenticular lens whose lenslets run parallel to the light emitting lines, and produces many small images of each light emitting source, plus a separate diffuser component that scatters light to produce even illumination for 2D or allows light lines to be focused to produce 3D images.

It should be noted that the embodiment described here is similar in configuration to embodiments described in our previous patent, U.S. Pat. No. 5,410,345 (see, in particular, column 3, line 53 to column 7 line 5), which is incorporated herein by reference.

Figure 1:
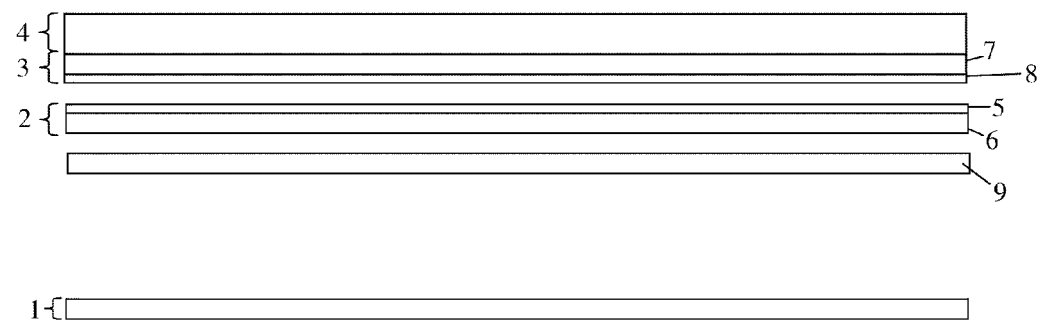
FIG. 1 is a side view of the major components of this invention.

FIG. 1 shows the major elements of a display incorporating the backlight, behind an image forming LCD (4). A complete display assembly, as will be understood by one skilled in the art, would also include mounting and mechanical assemblies, not shown.

At the rear of the system is a rectangular panel (1) used to generate a number of thin, linear, light emitting sources that are slanted relative to the sides of the panel. These linear light sources are typically slanted at an angle of 18.435 degrees to the edges of the panel, in other words, at a 3:1 slope angle where the centerline of each source drops by 3 units for every one unit of distance traversed to the right (or left in some configurations).

The slant angle of the light sources is related to the pixel height to width ratio of the LCD, so that the light sources are angled in a direction that causes them to be parallel to diagonal lines of pixel elements, as described above. The reason for the typical 18.435 degree slope angle is that the pixel elements usually have a 3:1 height to width ratio, which makes the slope angle of the sources also 3:1, or an angle of 18.435 degrees. However, if the pixel elements of a particular LCD have a height to width ratio that is different from 3:1, a different angle would have to be used.

Figure 2:
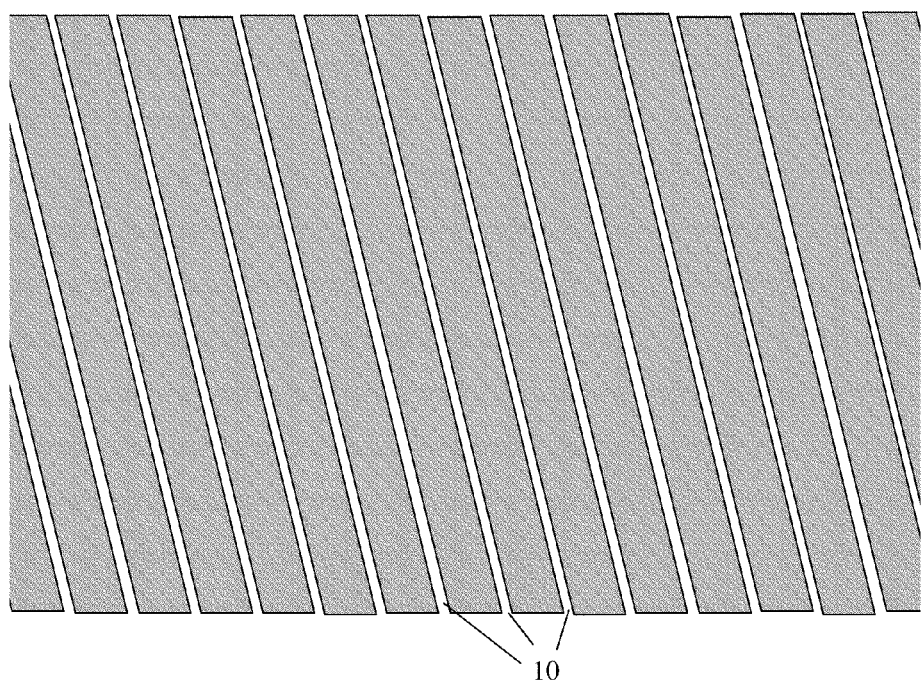
FIG. 2 is a front view of the light source used in this invention.

A front view of this device (1) is shown in FIG. 2 (a front view being defined as the view from the direction of the image forming LCD and the observer). These light sources (5) can be emitters that generate their own light, apertures that emit light generated behind them or reflectors that reflect light generated elsewhere, or some combination of these three. There are numerous ways to produce such lines. One preferred method consists of slanted rows of individual white LED emitters which collectively form the light emitting line sources shown in FIG. 2. Such LED emitters can be surface mounted on a PCB board. The pattern of light emitting lines (10) is shown in FIG. 2. The light emitting lines thus formed will tend to be on the order of 1-2 mm in width with a center to center spacing (pitch) on the order of 9-18 mm, depending on the exact design of the system. The space between the lines is preferably a flat black, so as to not emit or reflect light.

Figure 3:
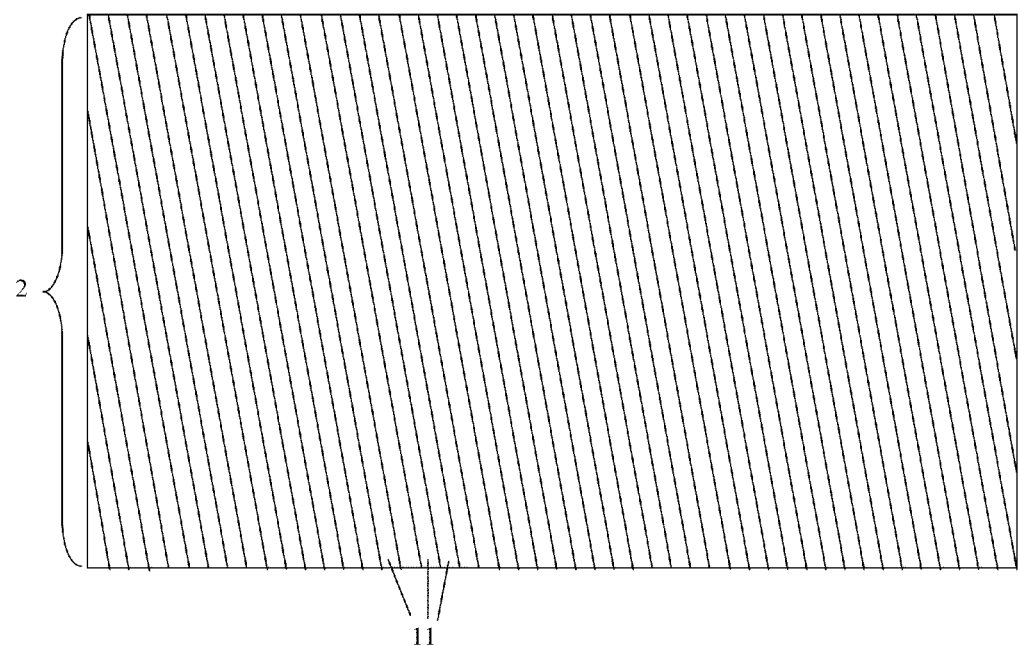
FIG. 3 is a front view of a lenticular lens with slanted lenslets that is used in this invention.

A lenticular lens (2), with cylindrical lenslets (11) as shown in FIG. 1 and as a front view in FIG. 3 is spaced in front of the light emitting lines. This lens is slightly larger than the active area of the LCD, and the cylindrical lenslets (11) on its surface are also tilted along the same 3:1 slope, parallel to the light emitting lines, as shown in FIG. 3. The lenticular lenses (2) will usually consist of a layer of molded plastic or epoxy lenslets (5) attached to a glass substrate (6), the latter for purposes of rigidity and thermal stability. The lens side can face toward or away from the light emitting sources, but it is usually necessary for the lens side to face away, toward the LCD, because of spacing considerations between the light lines they form and the LCD. The lenticular lenslets are of such a size that there is roughly one lenslet for every N columns of pixel elements, where N is the number of perspective views that are being produced.

Each lenslet produces small images of the light emitting lines. The spacing of the lenslets, their focal lengths, the distance between the light emitting lines and the lenslets, and the pitch of the light emitting lines are chosen so that the lines produced offset to the side by one are always coincident, with the lines produced by adjacent lenses. Together, the lenslets produce a series of small light emitting lines with one line for every N diagonal lines of pixel elements. Furthermore the spacing of the lines measured across the horizontal direction is slightly greater than the pitch of the pixel elements in the horizontal direction.

Figure 4:
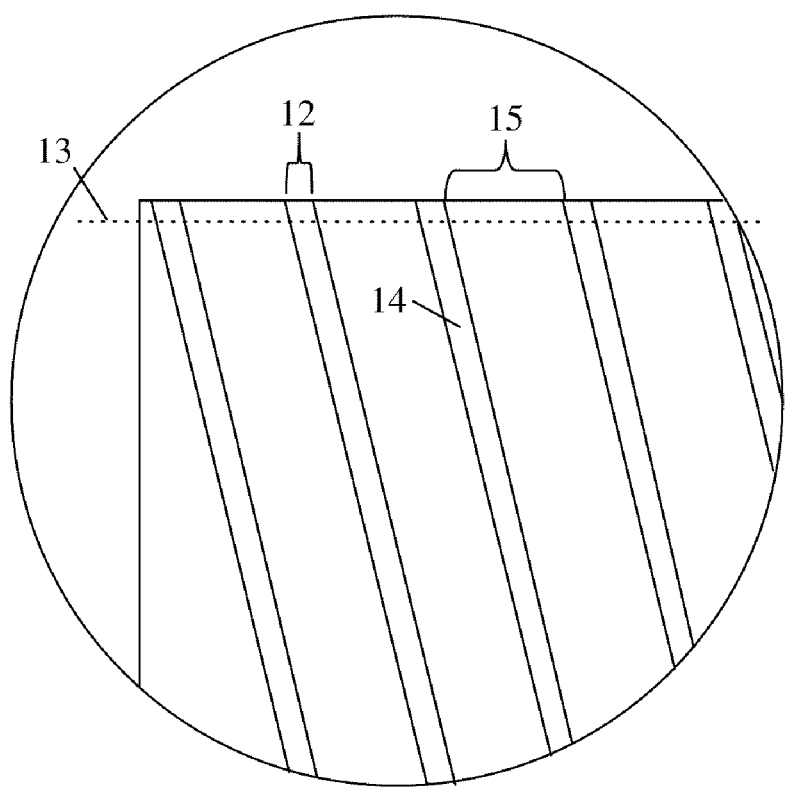
FIG. 4 is a close up of the light lines that are imaged by the lenticular lens shown in FIG. 3.

FIG. 4 is a magnified view of one corner of the diffuser upon which the light lines are imaged. In reference to FIG. 4, for best results, given that N perspective views are to be produced, using N sets of pixel elements, the ratio between the width (12) of the focused lines (14), as measured along horizontal lines (13) parallel to the rows of pixels in the LCD bisecting the focused lines and their pitch (15) (center to center distance along the same lines) should be 1/N, and the apparent width of the lines, as seen by the observer, is equal to the horizontal width (and pitch) of the pixel elements. This generally implies that the ratio between the width of the light emitting line sources and their pitch is also equal to 1/N.

The formula describing the required center to center spacing of the lines of light, as measured along horizontal lines (13), needed to create N different perspective views each of which are visible within separate viewing zones that are E mm wide (E is typically either close to 63 mm, corresponding to the average separation between a pair of adult human eye pupils, or close to 31.5 mm, which is half the average separation between a pair of adult human eye pupils), is mathematically equivalent to the formulas given in the previously mentioned patents owned by the present assignee, but which is simplified here for clarity to:

$$P = \frac{N}{\left(\frac{1}{E} - \frac{1}{Z}\right)}$$

where E is the width of the pixel elements, Z is the width of the viewing zones that one wishes to produce, N is the number of perspective views that one wishes to display (and the number of sets of pixel element columns or diagonals on which these images are displayed) and P is the pitch (center to center of the light emitting lines).

In general, the number of viewing zones thus produced has to be a multiple of three for the type of simple image distribution pattern described below to work, however other numbers of viewing zones are possible using more complex patterns which are beyond the scope of this particular disclosure.

If the condition whereby the width of the line appears to be exactly equal to the width of the pixel element as seen by the observer is met, moiré lines caused by parts of the lines being hidden behind the pixel boundaries when viewed from certain angles will be almost totally eliminated. This moiré effect is well known and often observed in the field of autostereoscopic display technology. The reason for the lack of moiré effects in the case described above is that no matter where the line appears relative to the pixels and their boundaries, an nearly equal percentage of the line is hidden between the pixels. Some variation in this width is allowable without causing moirés to become obvious; experiment indicates that a variation of +/−5% of this width produces acceptable results.

In most circumstances the lines formed by the lenticular lenses must be focused on a thin, weak diffuser (3) to produce even illumination. This diffuser is mounted behind the LCD (4) and typically within 1 mm of its rear surface. The diffuser will typically consist of a thin layer of diffuse material (7) attached to a thin glass or plastic substrate (8), with the substrate side facing the LCD and providing the correct spacing between the LCD, its pixels, and the light lines focused on the diffuser.

Figure 6:
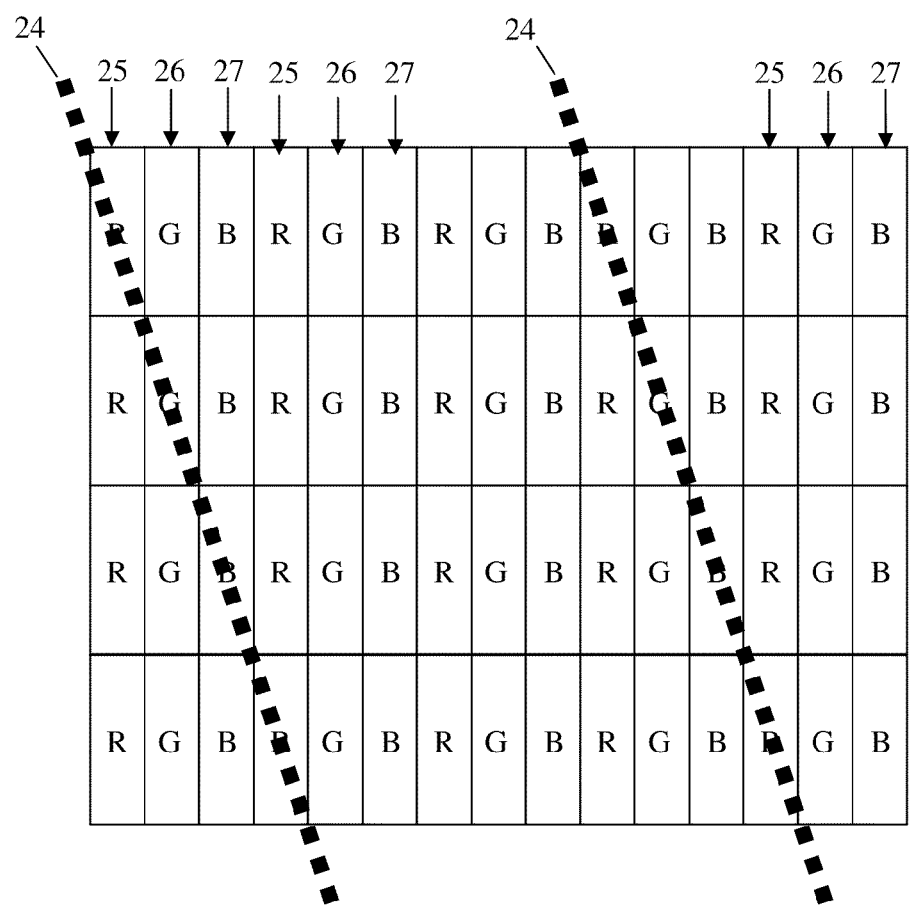
FIG. 6 illustrates the way that the lines of light, imaged on the diffuser, are angled relative to the pixel elements in front of them.

FIG. 6 illustrates the way that the lines of light, imaged on the diffuser, are angled relative to the pixel elements in front of them. The lines of light are shown as dotted lines (24). The red (25), green (26), and blue (27) pixel elements with 3:1 height to width ratios are shown in front of them. As can be seen, the lines of light are angled so that they run parallel to diagonals of the elements.

An optional electrically controllable diffuser (6) may be placed within the backlight, ideally between the light emitting line sources and the lenticular lens. This type of diffuser is typically used for privacy windows, and uses a type of liquid crystal technology called PDLC (Polymer Dispersed Liquid Crystal) or PNLC. Diffusers of this type are made by several companies in the US including Scienstry, Polytronix, and others. This diffuser operates in two states: when voltage is applied across it, it becomes clear; when no voltage is applied it is diffuse and white in color. Use of such electronic diffusers and their operation was also described in U.S. Pat. No. 5,410,345 in column 6, lines 17-29.

A layer of this material is placed far enough in front of the light emitting lines that when the diffuser is in its first, diffuse, state, it causes them to become diffused into each other as seen from the other side, making them invisible, so that illumination coming from the diffuser is evenly spread across its surface. The lenticular lenslets no longer "see" the light emitting lines, they merely image the even, diffuse illumination emitted by the controllable diffuser, and produce even illumination across the first diffuser directly behind the LCD. Under this illumination condition, which is similar to that produced by a conventional backlight, all of the pixels of the LCD are visible from all positions in front of the LCD, and the LCD can be used to display conventional 2D full resolution images.

When the electronic diffuser is in its second, clear, state, its diffusion properties disappear (or are greatly reduced), making the diffuser clear and transparent, like a piece of glass. The light emitting lines are now clearly visible behind it. The lenticular lens therefore focuses images of the light lines on the first diffuser directly behind the LCD, and the 3D effect is created, whereby an observer's eye situated in a viewing zones in front of the display sees a line behind every Nth pixel element diagonal, and nothing but darkness behind the diagonals in between. That eye thus only sees the perspective image on one of the sets of pixel element diagonals, the one that appears to have illumination behind it. The observers other eye will always see the lines behind another set of element diagonals, and will see the different perspective view displayed on those elements.

As compared to embodiments described in our previous patent, U.S. Pat. No. 5,410,345, in the system of this invention the light sources, lenses, and imaged lines are tilted with respect to the pixel columns, and the line widths are of the same apparent width as the pixel element columns of the image forming LCD. Also differing from the previous patent is the mechanical movement system described below.

Figure 5A:
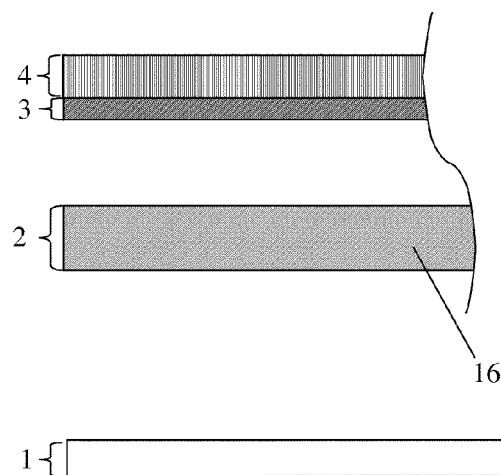
FIGS. 5a and 5b are a side view illustrating mechanical movement of the lenticular lens that is used to switch between 2D and 3D modes of illumination and image display.
Figure 5B:
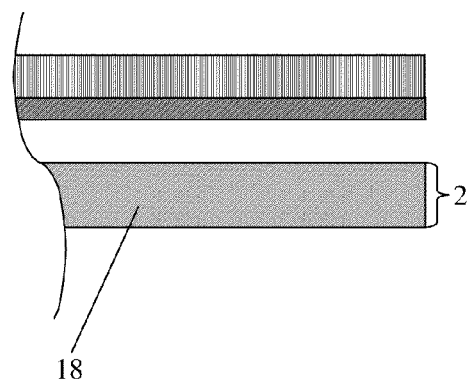
Figure 5C:
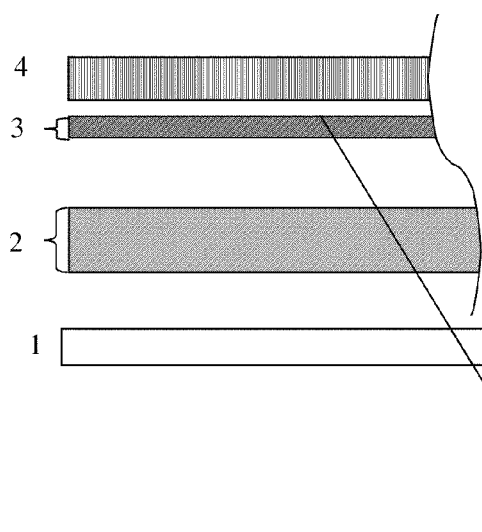
FIGS. 5c and 5d are a side view illustrating mechanical movement of the diffuser that is used to switch between 2D and 3D modes of illumination and image display.
Figure 5D:
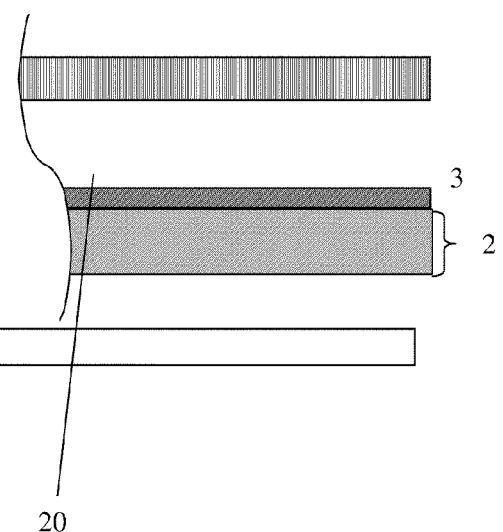

FIGS. 5c and 5d show an alternate means of producing 2D/3D switching, in which the electronically controlled diffuser is eliminated and instead the diffuser (3) behind the LCD (4) is made to mechanically move back and forth between a first position (19) near the LCD (4), and a second position (20) with its diffusion layer placed against the front of the lenticular lens (2). When in the former position (19), the light lines are imaged onto the diffuser (3) by the lenticular lens (2), and are visible to the observer in front of the LCD (4). In the other position (20), against the lenticular lens (2), the diffuser (3) intercepts and scatters the light before it can come into focus to form light lines. Therefore even, diffuse illumination is produced and 2D images can be displayed.

A variation on this mechanical movement concept is illustrated in FIGS. 5a and 5b. It uses a stationary diffuser (3) directly behind the LCD (4) but moves the lenticular lens (2) itself between one position (15), where it focuses lines on the diffuser, and a second position (16) (either forward against the diffuser or farther back from it) where the lines are not focused on the diffuser and instead, even diffuse illumination is cast on the diffuser. Typically, the position where the light lines are focused will be the forward position (15), and the lenticular lens will move backward by roughly 2-3 mm to a second position (16) where the light lines are defocused even illumination is created on the diffuser.

There are several possible methods of moving a lenticular lens or diffuser. In general, the lenticular lens must be moved forward with a slight sideways motion in such a way that two edges end up butted against three registrations posts (one edge against two and another perpendicular edge against the third) that are placed in such positions that the lenslets of the lenticular lens are aligned precisely with the pixel element diagonals of the LCD when the lenticular lens edges are butted against them.

Figure 7A:
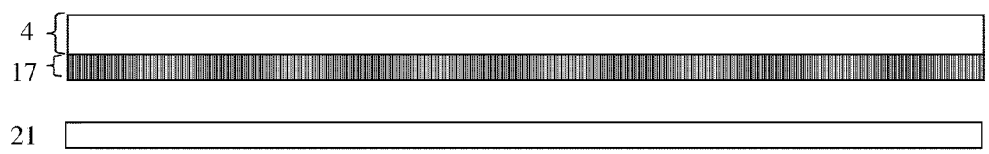
FIG. 7 is a side view of an alternate embodiment of the invention
Figure 7B:
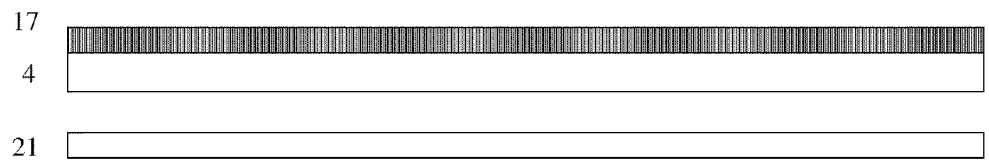

A different method of forming the slanted light lines is illustrated in FIGS. 7a and 7b. The variation of FIGS. 7a and 7b dispenses with the lenticular lens and diffusers and creates the light lines by means of transparent areas in a second, simple liquid crystal panel (17) situated behind the image forming LCD (4) in FIG. 7a and in front of the image forming LCD (4) in FIG. 7b.

The second liquid crystal display (17) is designed to be in a clear transparent state when no power is applied to it, but to display a series of dark opaque linear areas when power is applied. The opaque areas are designed so that in the power on condition the transparent, un-powered areas between them are in the shape of slanted lines or stair step line segment patterns. Light from a conventional off the shelf LCD backlight (21) placed behind the second LCD panel (17) will thus shine through these gaps, forming a series of slanted light lines, which serve the same function as the light lines described above. This arrangement using a second LCD is similar to that employed in U.S. Pat. No. 6,157,424, with the difference that the transparent lines are tilted instead of being vertical and parallel to one side of the panel.

It is also possible to place the second LCD panel (17) in front of the first, image forming LCD panel to form a parallax barrier, as is shown in FIG. 7b. However, in that case the spacing between lines of the second panel (17) will be different and slightly less that the spacing used in the "behind the image forming LCD" case of FIG. 7a. The formula for the pitch of the lines in this configuration will be:

$$P = \frac{N}{\left(\frac{1}{E} + \frac{1}{Z}\right)}$$

The width of the lines will likewise be P/N so that they appear to have the same width as the pixel elements to the observer.

Figure 8:
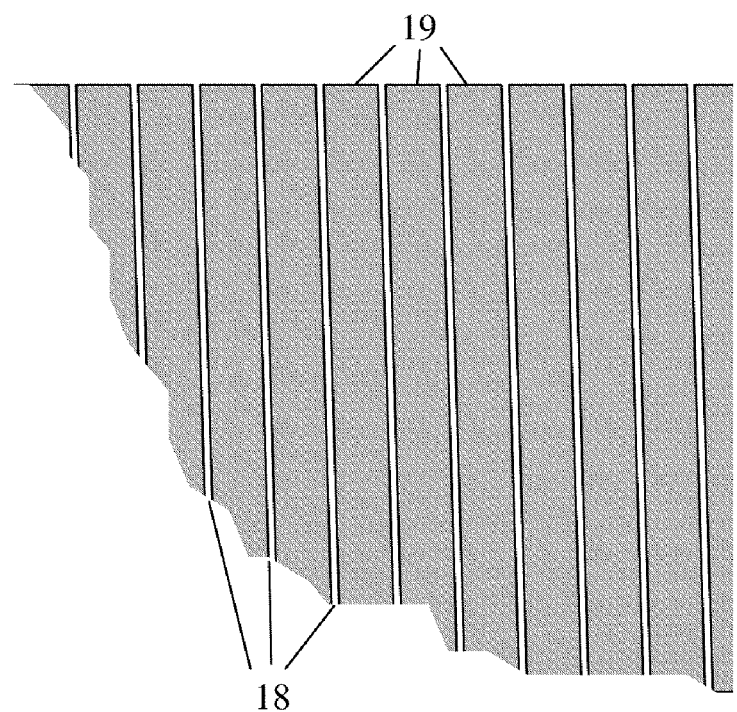
FIG. 8 is a front view of a secondary LCD panel that is used in the embodiment of FIG. 7.

The simplest configuration for the second LCD panel is illustrated in FIG. 8, which is a front view of the upper right hand corner of the aforementioned second LCD panel (17) when it is in the "on" condition. Here the un-powered areas (18) between the slanted, powered opaque areas (19) form a series of slanted transparent lines. Light from the backlight shines through the un-powered areas, forming slanted lines of light as seen from the image forming LCD side.

In this configuration, it is best if the transparent lines (18) have a width such that, as seen from an ideal observing plane, they appear to have the same width as the pixel elements have, as measured along horizontal lines running though them at any point. In the case of the second LCD panel being behind the image forming LCD, this means that the line width will be slightly more than the width of the pixel elements, since the second LCD will be slightly farther away from the observer than the image forming LCD. In the case of the second LCD being in front of the image forming LCD, it means that the line widths will be slightly less than those of the pixel elements, since the second LCD will be slightly closer to the observer than the image forming LCD. As in the lenticular lens configuration described above, this line width minimizes or eliminates moiré effects.

Figure 9:
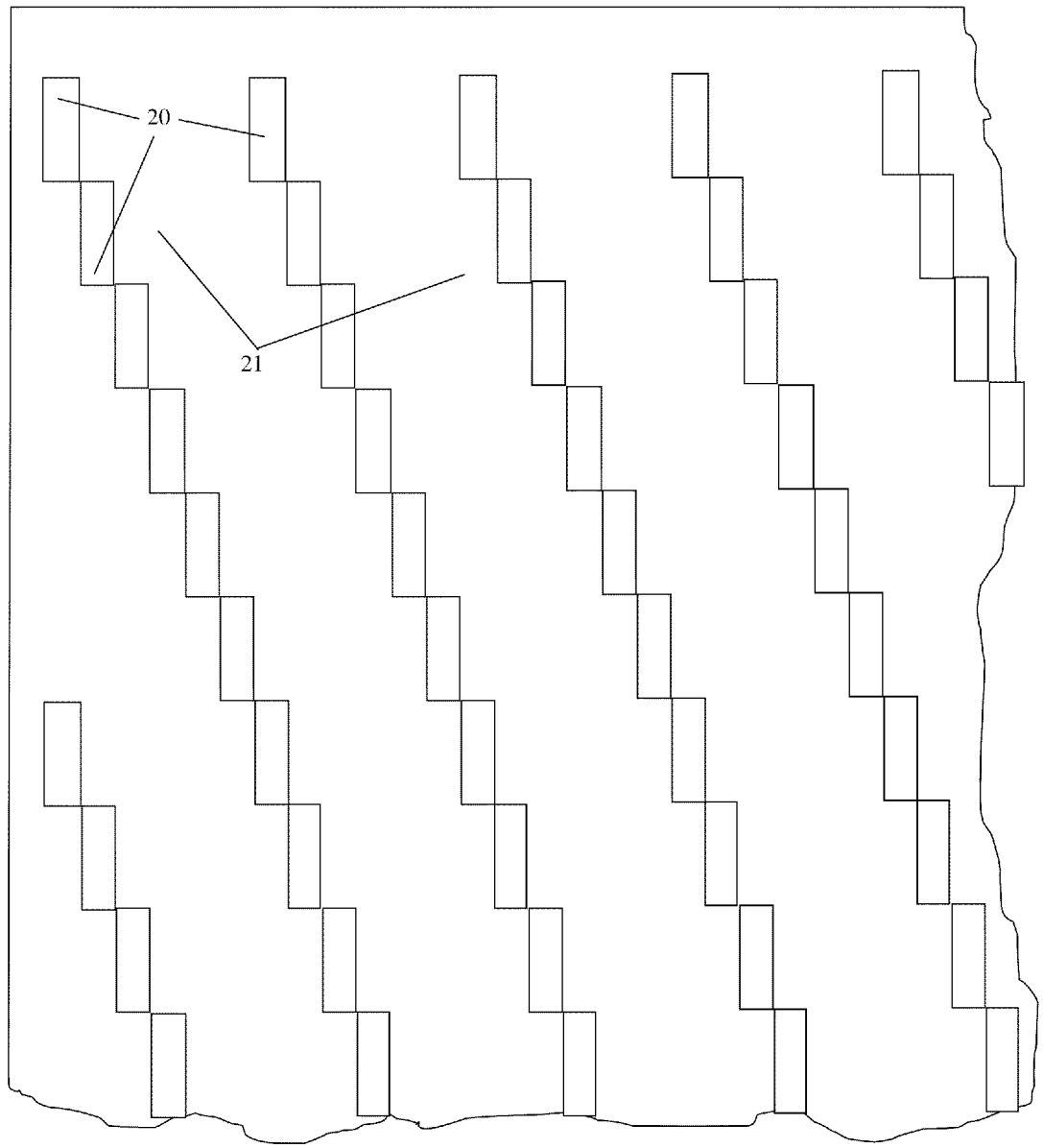
FIG. 9 is a front view of another configuration of the secondary LCD panel that is used in the embodiment of FIG. 7.

A second possible configuration for the opaque and transparent line regions on the secondary LCD is illustrated in FIG. 9, which is a magnified view of the upper right hand corner of the LCD. In this configuration the un-powered areas (20) between opaque regions (21) form a "stair step" line pattern where each segment of the stair step has the same apparent width a long a horizontal line bisecting it as the pixel elements of the LCD, and the apparent height of the stair steps are equal to the height of the pixel elements as seen by the observer at the optimal viewing distance. A fully functional display utilizing this type of secondary LCD has been built and tested.

Figures 10A, 10B:
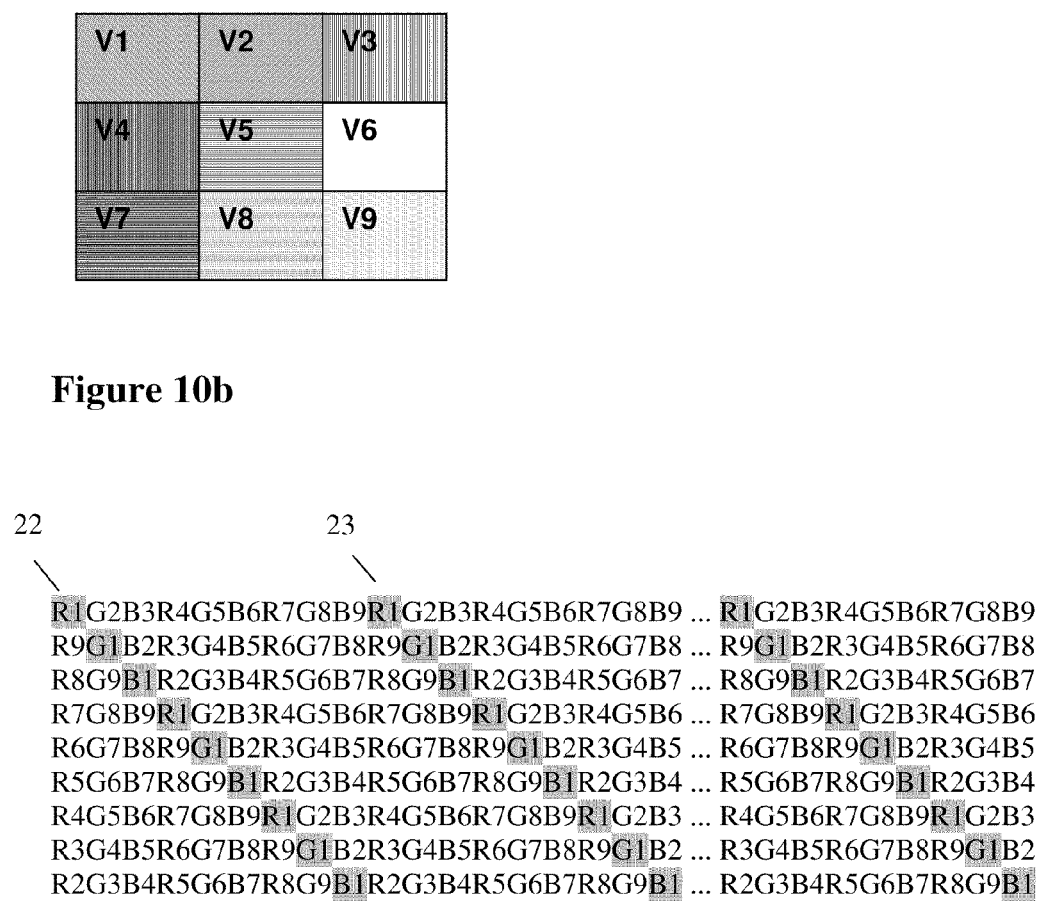

The manner in which images are generated for this type of display and how the image information is distributed among the diagonals of pixel elements is shown in FIGS. 10a and 10b, which illustrate a particular embodiment where nine different perspective views are displayed in such a way that they are visible from nine different viewing zones in front of the display. Nine view displays are the most common type on the market today. This type of pixel arrangement is standard to the industry and is provided by way of explanation.

It should be noted that the pixels elements in FIGS. 10a-10b are not drawn to scale. They are drawn such that the elements themselves are square. In reality they would be three times as high as they are wide. Also, lining and stippling is used to denote which image is mapped onto which set of pixel elements. In reality, the color of each element is that which is denoted by the R, G, and B designations found within each element.

FIG. 10a represents an electronic image file with M×N resolution. This image file will be equal in resolution to the LCD upon which the images are to be displayed. Nine images, which are perspective views of some scene rendered or imaged from nine different locations along a horizontal line, as is standard practice in the art of multiview autostereoscopic display, are typically rendered so that each image possesses a resolution of $$\left(\frac{M}{3} \times \frac{N}{3}\right)$$

The nine images, designated V1-V9 in FIG. 10a, are placed in a 3×3 array within the file, which is a two dimensional array of intensity values for the red, green and blue elements within each image. Through software or electronic means, the individual pixel elements of each image are rearranged onto the LCD itself into the elements marked R1, G1, B1, etc along the diagonals of FIG. 10b. For illustration purposes, the diagonals in FIG. 10b which correspond with image V1 have been shaded.

For example, the three (red, green, and blue) elements of the pixel in the upper left hand corner of image V1 are displayed on the pixel elements marked R1, G1, and B1 of the LCD, along the diagonal marked (22) (note once again that the "R" designated a red element, the "G" a green element, etc. Note also the all the red elements, green elements, and blue elements are in vertical columns.) The elements next pixel to the right are placed on the first three elements of the next diagonal to the right, which is marked (23), and the elements of the second pixel to the right are placed in the next diagonal (not shown in the diagram). The first pixel of the second row of image V1 is placed in the second set of elements along diagonal (22). The first pixel of the third row of image V1 is placed in the third set of three elements along diagonal (22). Then the first pixel of the fourth row of image V1 is placed in the first three elements of the next diagonal down (not shown), and so forth.

The pixels in images V2, are displayed along the diagonals marked R2, G2, B2, etc. in a similar pattern. The pixels in images V3, are displayed along the diagonals marked R3, G3, B3, etc. in a similar pattern, and so forth.

The light lines of the display are spaced so that to observer's eyes in certain positions, they appear to be situated behind the diagonals where the elements of image V1 appear, and as the observer moves to one side or the other the light lines seem to pass behind—and illuminate—the diagonals where the elements of images V2, V3, etc. to V9 appear.

The preceding has been an overview of the broad design concepts involved in the invention. Details of design and construction will also contribute to the quality of the image that is displayed on the device and allow construction of the device in a cost effective manner.

Figure 11:
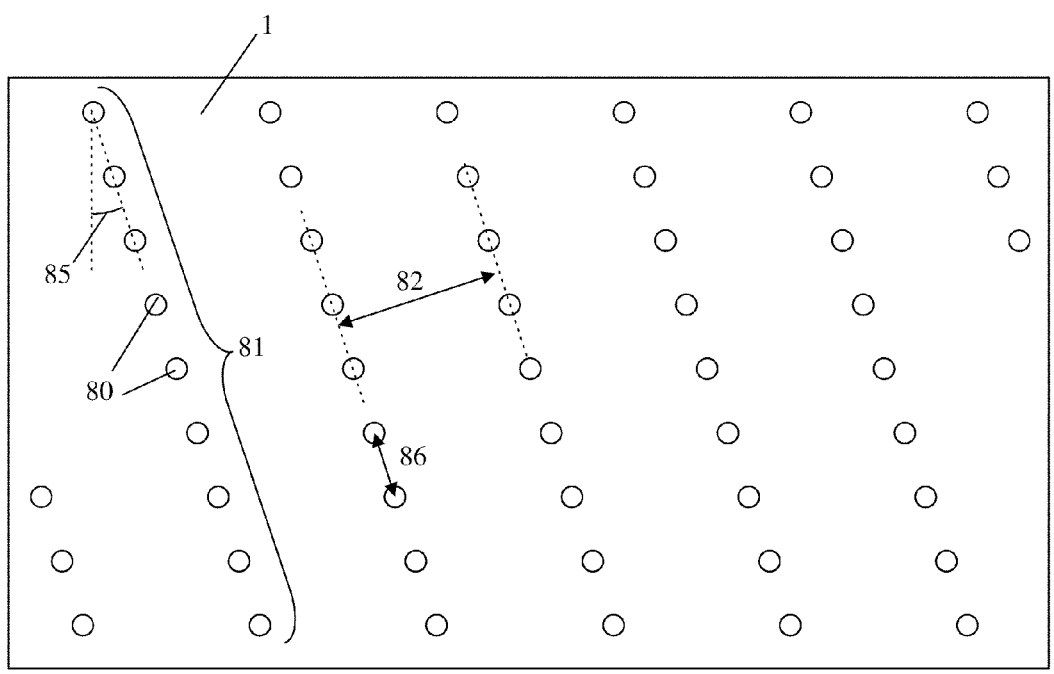
FIG. 11 is a front view of an LED based light source used with this invention.

A very effective lighting system for this type of device can be manufactured by using an array of LEDs as shown in FIG. 11. The LEDs (80) are arranged in columns (81) that are tilted at the same angle to the vertical as the lenticular lenses and light lines, which is 18.435 degrees in the examples above. This will be the angle used for a typical LCD, which has pixels with a 1:1 height to width aspect ratio, said pixels being divided in the horizontal direction into red, green, and blue pixel elements with 3:1 height to width aspect ratios. Generally the columns of LEDs (81) will be spaced apart by some distance (82) measured along a direction perpendicular to the columns. This distance is determined in part by the focal ratios of the lenticular lenslets and the desired thickness of the display. In general, lenslets with focal ratios of f/2-f/3.5 (the ratio of the focal length to the width of the cylindrical lenslets) tend to produce evenly distributed illumination and yet do not force the lens to LED distance to be excessive. In such a case the ratio between the center to center distance between the columns (as measured perpendicular to the columns) and the LED to lens distance is roughly 1:2 to 1:3.5.

The LEDs do not have to be abutted to each other along each column. As long as a proper diffuser (3) in FIG. 1 is used in front of the lenticular lens (2), the adjacent LEDs in each column can have a considerable gap between them. For example, in experimental illuminations systems that have been constructed for testing, a distance equal to half the center to center column distance is used, again as is illustrated in FIG. 11.

For purposes of achieving even illumination and the widest possible viewing angle, LEDs with a Lambertian emitting pattern, that is with a full width half maximum angle of 120 degrees, are optimum. Nevertheless it is possible to use LEDs with a more directed emission pattern.

Given that the lines of light imaged by the lenticular lens should be nearly equal to the width of the LCD pixels, as measured in the horizontal direction parallel to the pixel rows (not perpendicular to the titled light line direction), the light emitting areas of the LEDs must be of the proper width for this to occur. This will be true if the width of the light emitting areas of the LEDs, as measured either in a direction perpendicular to the LED columns or in the direction parallel to the pixel rows, is equal to 1/N times the center to center distance of the LED columns, as measured in that same direction. The number N is equal to the number of perspective views that will be generated on the LCD. For example, if nine perspective views are to be displayed to create 3D images, then the width of the light emitting areas of the LED should be close to $\frac{1}{9}^{th}$ the center to center distance between columns of LEDs. If LEDs being used are too narrow, a diffuser can be placed a short distance in front of the LEDs to widen the apparent width of the LED.

In order to achieve visually even illumination within each light line and across the display, it is usually necessary to place a diffuser (3) at the focal plane of the lenticular lens (2), at or near the plane where the light lines are imaged. Such a diffuser can have (but does not have to have) different degrees of diffusion in two perpendicular directions. The best type of diffuser is one that achieves its diffusion properties on a single surface of a substrate by means of surface irregularities, or on or within a very thin layer on one side of the substrate. This ensures that the line of light imaged onto the diffuser is sharp and not blurred significantly by the diffuser itself. It also ensures that very little light is scattered within the diffuser or its substrate in such a way that it exits the diffuser between the lines of light. The best type of diffuser will also have a very well defined Gaussian diffusion pattern that drops off to zero or near zero beyond some defined angle in each direction, so as to minimize light scatter.

The diffuser generally needs very little diffusion in the direction perpendicular to the LED columns, since the lenticular lens is spreading light in that direction and diffusion is only required to even out bright or dark areas where swaths of light being spread out in front of one column of light sources touch or overlap slightly with swaths of light from the next column of light sources. More diffusion is required in the direction parallel to the LED columns, in order to spread the light evenly in that direction and fill in the gaps between the LEDs with light, thus avoiding hot spots in front of the LEDs. Given a Gaussian diffuser, a Full Width Half Maximum (FWHM) angle roughly equal to the angle between adjacent LEDs along a column, as seen from the diffuser, will be acceptable. In experimental lighting systems, a full width half maximum (FWHM) diffusion angle of 10 to 15 degrees in the direction parallel to the columns of LEDs was found to be sufficient. Diffusion in the direction perpendicular to the columns can be much smaller, typically less than 5 degrees, since the lenticular lens itself acts as a single directional diffuser in this direction.

If a simpler diffuser with equal diffusion in all directions is used, the diffusion angle should be sufficient to diffuse light evenly in the direction of the columns. In general, a diffuser with as little diffusion as possible, while still producing even light distribution should be used since a weaker diffuser generally reflects less light and contributes less to ghosting (image crosstalk) between the various perspective views than a strong one does.

Figure 12:
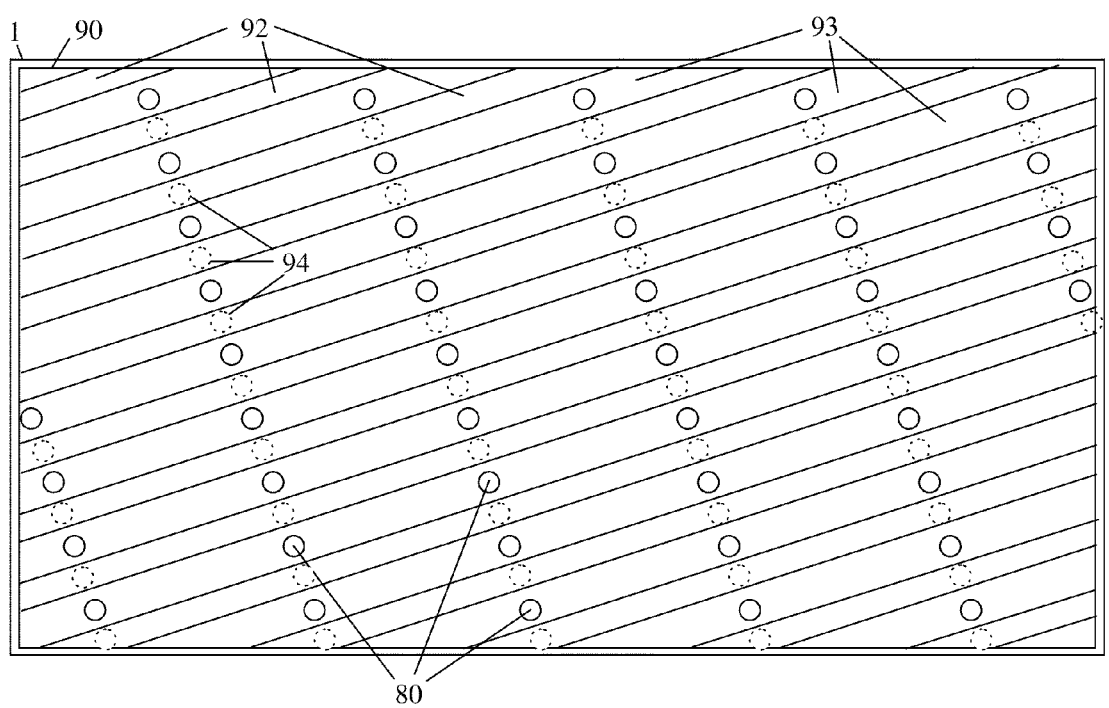
FIG. 12 is a front view of a brightness enhancing film configuration that can be used with the light source of FIG. 11.

More efficient use of light, and a greater apparent display brightness for given light sources can be achieved by the addition of a type of "brightness enhancing film," (90) in FIGS. 12 and 13, similar to that used in the backlights of conventional LCD displays and placed in a certain configuration in front of the lamps as shown in FIGS. 12 and 13. FIG. 12 is a view from the direction facing the LEDs, and FIG. 13 is a cross sectional view.

This film is designed to intercept light that is exiting the lamps at high angles to the normal, and redirecting it forward to the area from which people are likely to be viewing the display, thus increasing the perceived brightness of the display. Such film usually consists of a thin plastic sheet with microscopic sawtooth ridges molded into one side, the other side being flat or covered with irregularities to create a diffusing surface. In conventional LCD backlights such films are commonly used in combination with diffusers and placed in front of side illuminated light guides. A variety of such films are made by 3M, among other sources.

For the present invention, a similar film structure can be used, in which one surface of a film is covered with small prism like structures or ridges (91) in FIG. 13, but only in certain linear areas (92) in FIG. 12, with smooth transparent gaps (93) in FIG. 12, between the linear areas. Such a film would be designed to be held in a plane slightly in front of the LEDs as shown. The center to center distance and the width of the gaps would be such that as seen from in front of the LEDs, the gaps would occupy the spaces between the individual LEDs of each row. Furthermore, the direction of the grooves would be angled at 90 degrees from the direction of the LED columns (81) as shown in FIG. 12.

Light from the lamps exiting at high angles from the normal will be intercepted by the ridges and redirected forward, at an angle closer to the normal. If one views the LEDs and films from the front, without any other elements in place, one would see refracted images (94) of each LED (80) behind the grooved strips or gaps above and below each LED.

For purposes of creating even illumination, it is best if the angles of the ridges and the distance between the ridged sheet and the surface where the LEDs are mounted is chosen such that the refracted images (94) are spaced evenly relative to each other and to the real LEDs as shown in FIG. 12. It is also possible to choose the ridge surface angles and the distance to the LED mounting surface so as to cause the refracted images from the LEDs above and below each strip to be superimposed on each other as shown. Use of film in this manner allows a weaker diffuser to be used at the focus plane of the lenticular lens, since the gap between these images of the LEDs is less than that between the LEDs themselves.

This is one possible choice of light emitters and arrangement for light emitters; there are numerous other possibilities that will be apparent to those familiar with the art of LCD backlight design, such as CCFL lamps set at an 18.435 degree angle, reflective light channels with LEDs at either end, light guides possessing linear reflective structures on one surface, and others.

Figure 14:
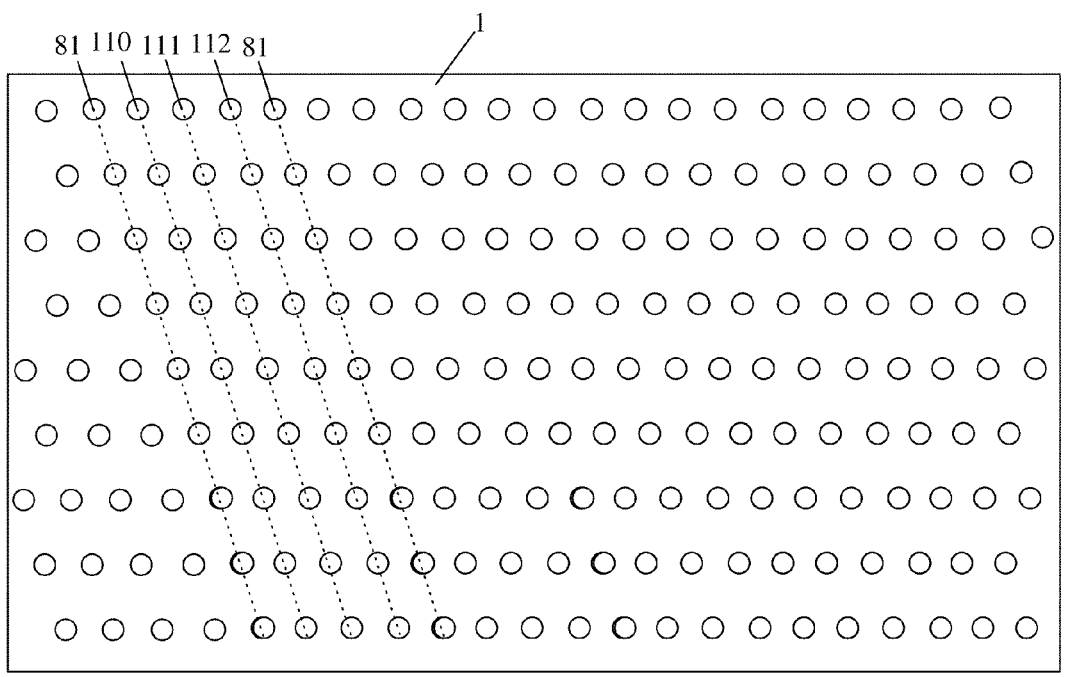
FIG. 14 shows an arrangement of the embodiment of FIG. 11, in which additional columns of LEDs are added.

As stated above, and in U.S. Pat. Nos. 5,036,385 and 5,410,345, two or more sets of flashing lines of light plus rapid changes of the image on the LCD can be used to reduce the amount of resolution lost in the process of creating 3D images with multiple perspective views. The creation of two or more sets of flashing lines of light can be accomplished in the LED arrangement described above by adding more columns of LEDs (110, 111, 112), as shown in FIG. 14, between the columns of LEDS (81) shown in FIG. 11. When these additional columns of LEDs are turned on their light will be focused into lines of light that are positioned between the lines focused from the light of LED columns (81).

In order to produce lines that flash in sequence as described above in reference to the use of multiple sets of flashing lines of light, the additional columns of LEDs must be independently controlled, so that the LEDs of columns (81) are first turned on and off, then the columns (110), then the columns (111) and so forth, as different images are displayed on the LCD. This is the same process that is described in U.S. Pat. No. 5,410,345, except that in this configuration the columns and lines of light are tilted, and the light sources are a series of LEDs.

Figure 15:
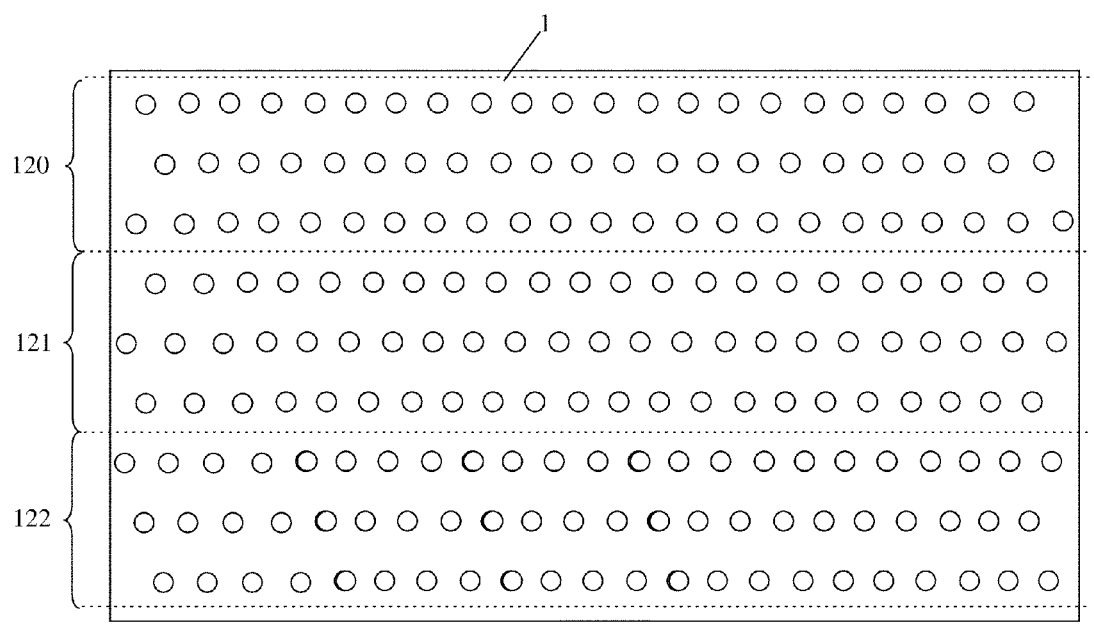
FIG. 15 shows the arrangement of FIG. 14, indicating horizontal sections.

As shown in FIG. 15 in the arrangement above, the LEDs should be also be connected and driven so that different horizontal sections (120), (121) and (122) of each set of LED columns (81, 110, 111, etc. in FIG. 14) can be illuminated in sequence after the section of the LCD in front of it has been scanned and the pixels in that section have completed their change to form part of the next image, as explained in U.S. Pat. No. 5,410,345. Although three sections (120), (121), and (122) are shown here for simplicity, the number of sections will typically be on the order of eight to sixteen, depending on the changing speed of the LCD pixels and the number of LEDs.

Figure 16A:
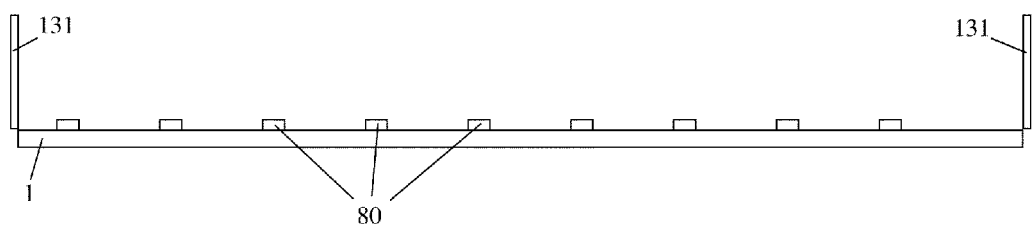
FIG. 16a shows a cutaway side view in an embodiment having reflectors.

The illuminator arrangements described above will tend to create an area of shadow at the edges of the LCD image when it is viewed from off axis in any direction, unless the size of the LED array is substantially larger than the active area of the LCD in all directions. It is not always possible or desirable to make the LED array substantially larger due to constraints in the size of the case enclosing the LCD or simple aesthetic or size and weight considerations. In such a situation, an attractive solution is to have the columns of LEDs end just beyond the limits of the active area, and place a reflector on the top and bottom walls of the housing that encloses the LED illuminator, lenticular lens, and other elements behind the LCD, as shown in FIG. 16a, which is a cutaway side view.

This reflector preferably has a defined surface structure instead of being flat, so as to make the reflected lines of LEDs seem to extend behind the reflector at the same angle as they are situated in front of it. A flat reflector would cause the reflections to seem to be bent in the opposite direction (i.e. leaning clockwise from straight up and down if the LED columns are leaning counterclockwise).

Figure 16B:
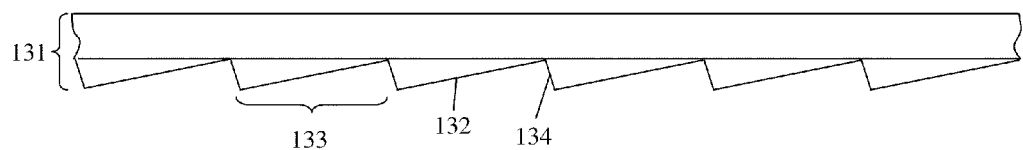

This can be accomplished by giving the reflector (131) a sawtooth cross section as shown in FIG. 16b, with the wide flat surfaces (132) of each sawtooth (133) making an angle of 18.435 degrees with the wall of the housing, and therefore an angle of 90 degrees to the direction of the LED columns (81). Typically, each sawtooth can be a fraction of a mm wide. The wide surfaces (132) of each sawtooth should be made reflective. The short sides (134), which can most easily be oriented at 90 degrees from the long sides, will ideally not be reflective, but can be reflective without significant degradation to performance. The reflectors on the top wall and bottom wall of the enclosure can be identical in configuration, but the wide areas of the sawtooth surfaces on each side will be oriented perpendicular to the LED columns that are intercepting that side.

This type of reflector can be used regardless of the type of illumination used on panel 1. This type of reflector can be used with any form of panel 1 that emits light from slanted lines or sources in a slanted rows.

Figure 17A:
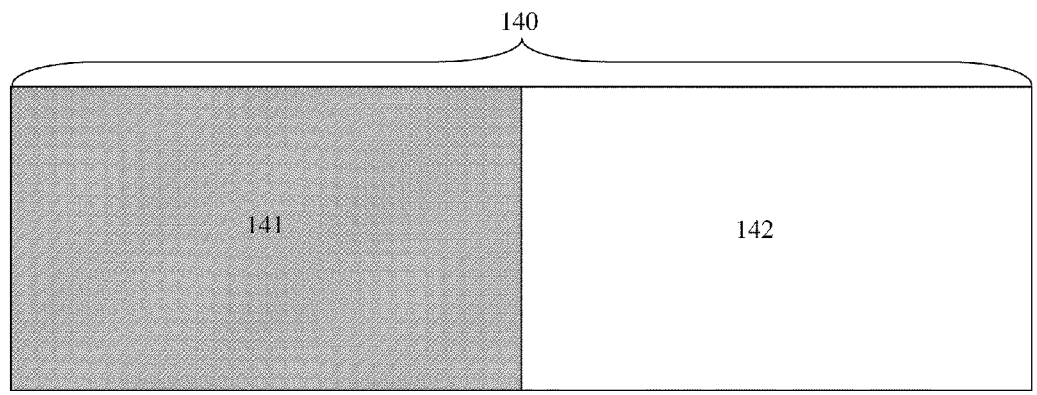
FIG. 17a shows a sheet of material for use in a method of switching between even illumination and light line illumination.
Figure 17B:
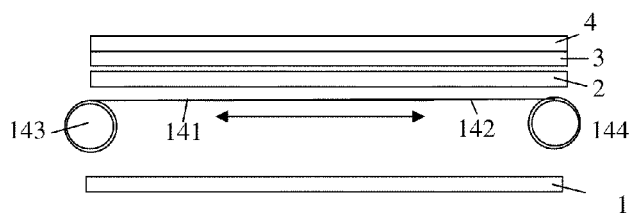
Figure 17C:
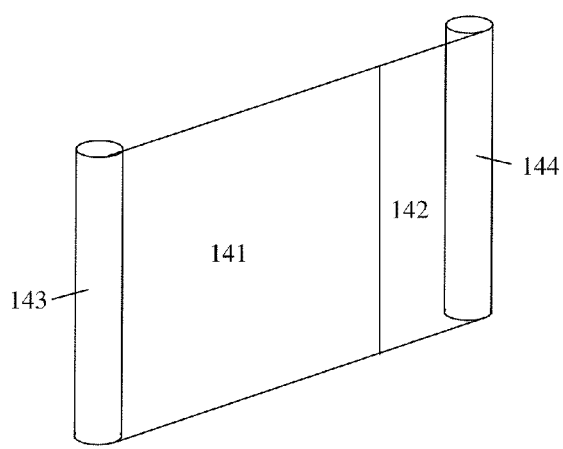
FIG. 17c shows how the sheet of FIG. 17a is rolled.

An additional method of switching between even illumination for 2D image mode and light line illumination for 3D image mode is shown in FIGS. 17a-17c. This alternative appears to be less costly than either the PDLC or moving lenticular lens or diffuser options described above. This alternative uses a sheet of thin plastic material (140) possessing one section (141) which is diffuse and a second section (142) which is transparent as shown in FIG. 17a. Both sections are large enough to cover the area behind the LCD and the lenticular lens.

The sheet is mounted on rollers (143, 144) positioned on either side of, or at the top and bottom of the LCD (4), in the area between the rectangular panel (1) and the LCD (4) as shown in FIGS. 17b and 17c, with the best location usually being behind and close to the lenticular lens (2), between it and rectangular panel (1) as shown.

When 2D images are displayed, the sheet (140) is rolled up on one of the rollers (144), bringing the diffuse section (141) into position behind the LCD as shown in FIG. 17b, and creating even, diffuse light. When 3D images are displayed, the sheet (140) is rolled up onto the roller (143) on the opposite side, thus bringing the clear area (142) of the sheet (140) into position behind the LCD (4) as shown in FIG. 17c. The lenticular lens now focuses light into the lines of light necessary for 3D viewing.

The displays of the type described in this disclosure are often used for purposes of point of sale or tradeshow advertising where people view them from a wide range of distances. The amount of depth that can be shown on such displays is usually limited by factors such as ghosting (image cross talk) and image "jump" or discontinuities between the different perspective views, all of which are well known to those well versed in the art of autostereoscopic display technology.

In general, when a given display is viewed from far away the amount of depth that can be displayed in an image without these undesirable effects occurring is greater than that which can be displayed to an observer who is close to the display. In addition, the farther away a person is from the display, the greater the depth that must be displayed in the image in order for the 3D nature of the scene to be obvious and attract the person's attention. Therefore a useful feature on such a display is a sensor, such as an IR sensor or UV emitter and sensor combination that, at minimum, can determine whether someone is standing close to the display (and presumably looking at it) or not. If no close-in person is detected, the display can be directed by software to display images with a great deal of depth, in order to attract the attention of people walking by at a distance, for example in the aisle at a tradeshow. If someone standing close is detected, the depth can be reduced in order to minimize undesirable image effects for the close in user, while still maintaining enough depth to make the 3D effect compelling.

This change in depth representation can be accomplished by switching between two animations or two versions of the same animation with different amounts of depth, or in the case of real time computer graphics display, changing the spacing between the virtual cameras that are being used to render the perspective views. The cameras will be brought closer together for close in viewing and farther apart for viewing by persons farther away.

A more sophisticated system could be used measure the distance to at least one user within sensor range and optimize the amount of image depth for viewing at that user's distance. There are many types of laser rangefinders and lidar systems on the market for purposes ranging from the creation of 3D models of large objects to military targeting. Ultrasound rangefinders are used for measuring rooms in real estate applications and were once used as rangefinders for cameras. Ultrasound sensor and emitter combinations that can measure the position of a person's head for a different purpose are described in U.S. Pat. No. 5,349,379, incorporated herein by reference.

Accordingly, it is to be understood that the embodiments of the invention herein described are merely illustrative of the application of the principles of the invention. Reference herein to details of the illustrated embodiments is not intended to limit the scope of the claims which will be filed in the utility application claiming the benefit of this provisional application, which will themselves recite those features regarded as essential to the invention.

I claim:

1. A backlight system for producing a plurality of perspective views on LCD displays, for location behind an image-forming LCD having rows and columns and diagonal lines of pixel elements, comprising:
   a) a rectangular panel comprising a plurality of thin, linear light emitting sources, the light sources being slanted at a slope angle relative to sides of the panel in a direction such that the linear light emitting sources are parallel to diagonal lines of pixel elements; and
   b) a lenticular lens between the rectangular panel and the LCD, spaced in front of the light emitting sources, comprising a plurality of cylindrical lenslets on a surface of the lenticular lens, the cylindrical lenslets being slanted at a slope angle relative to sides of the lenticular lens in a direction such that the lenslets are parallel to the linear light emitting elements of the rectangular panel;
      such that the linear light emitting sources and the lenslets produce a series of small light emitting lines with one line for every N diagonal lines of pixel elements, where N is the number of perspective views to be produced.

2. The backlight system of claim 1, in which the slope angle of the linear light emitting sources is related to a height to width ratio of the pixel elements of the LCD.

3. The backlight system of claim 2, in which the pixel elements have a 3:1 height to width ratio, and the slope is 3:1.

4. The backlight system of claim 1, in which the linear light emitting sources generate their own light.

5. The backlight system of claim 4, in which the linear light emitting sources are rows of LED emitters which collectively form the linear light emitting sources.

6. The backlight system of claim 5, further comprising a brightness enhancing film between the LED emitters and the lenticular lens.

7. The backlight system of claim 6, in which the brightness enhancing film comprises a thin plastic sheet in which one surface of the film is covered with ridge structures in linear areas, so that light from the LEDs exiting at high angles from the normal will be intercepted by the ridge structures and redirected forward, at an angle closer to the normal, the film having with transparent gaps between the linear areas, the center to center distance and the width of the gaps being such that as seen from in front of the LEDs, the gaps occupy spaces between individual LEDs.

8. The backlight system of claim 7, in which angles of the ridge structures and the distance between the plastic sheet and the surface of the rectangular panel on which the LEDs are mounted is chosen such that refracted images of the LEDs are spaced evenly relative to each other and to the LEDs.

9. The backlight system of claim 4 in which the linear light emitting sources are CCFL lamps set at an 18.435 degree angle.

10. The backlight system of claim 1, in which the linear light emitting sources are apertures that pass light from a light source behind the apertures.

11. The backlight system of claim 1, in which the linear light emitting sources are reflectors that reflect light.

12. The backlight system of claim 11, in which the linear light emitting sources are reflective light channels with LEDs at either end.

13. The backlight system of claim 11, in which the linear light emitting sources are light guides possessing linear reflective structures on one surface.

14. The backlight system of claim 1, in which spaces between the linear light emitting sources on the rectangular panel is black.

15. The backlight system of claim 1, in which the lenticular lens comprises a layer of molded lenslets attached to a glass substrate.

16. The backlight system of claim 1, in which the lenslets are of such a size that there is one lenslet for every N columns of pixel elements on the LCD.

17. The backlight system of claim 1, in which a spacing of the lenslets, a focal length of the lenslets, a distance between the linear light emitting sources of the rectangular panel and the lenslets of the lenticular lens, and a pitch of the linear light emitting sources are chosen such that lines produced offset by one are coincident with lines produced by adjacent lenses.

18. The backlight system of claim 1 in which the light from the linear light emitting sources, focused by the lenslets of the lenticular lens, form a plurality of focused lines having a width and a pitch, and a ratio between the width of the lines, as measured along horizontal lines parallel to the rows of pixel elements in the LCD bisecting the focused lines, and the pitch of the focused lines is 1/N, and an apparent width of the lines, as seen by an observer, is equal to a horizontal width and pitch of the pixel elements of the LCD.

19. The backlight system of claim 1, in which a ratio between a width of the linear light emitting sources and a pitch is equal to 1/N.

20. The backlight system of claim 1, further comprising an electrically controllable diffuser between the linear light emitting sources and the lenticular lens, the diffuser being electrically controllable between a first state wherein the diffuser is diffuse, and a second state wherein the diffuser is clear.

21. The backlight system of claim 20, in which the electrically controllable diffuser is placed far enough in front of the linear light emitting sources such that when the diffuser is in the first state, the sources are diffused into each other as seen from the side of the diffuser opposite the side facing the linear light emitting sources, so that illumination coming through the diffuser is evenly spread across its surface.

22. The backlight system of claim 21, in which the display is switched between a 2D mode and a 3D mode by changing the state of the electrically controlled diffuser between the first state to the second state, such that the display is in 2D mode when the electrically controlled diffuser is in the first state in which the sources are diffused into each other and in 3D mode the electrically controlled diffuser is in the second clear state.

23. The backlight system of claim 1, further comprising a diffuser between the lenticular lens and the LCD for providing even illumination of the LCD.

24. The backlight system of claim 23, in which the diffuser comprises a thin layer of diffuse material attached to a thin glass or plastic substrate, with the substrate facing the LCD.

25. The backlight system of claim 23, in which the diffuser is movable between a first position near the LCD wherein lines of light from the linear light emitting sources lines are imaged onto the diffuser by the lenticular lens and are visible to an observer in front of the LCD, and a second position near the lenticular lens wherein the diffuser intercepts and scatters the light such that diffuse illumination is produced.

26. The backlight system of claim 25, in which the display is switched between a 2D mode and a 3D mode by changing the position of the diffuser from the second position to the first position, such that the display is in 2D mode when the diffuser is in the position in which diffuse illumination is produced and in 3D mode the diffuser is in the position in which lines are imaged on the diffuser.

27. The backlight system of claim 23, in which the diffuser is positioned next to the LCD, and the lenticular lens is movable between a first position nearer the LCD and a second position further away from the LCD, wherein in one of the first position and the second position lines of light are focused on the diffuser and in the other position diffuse illumination is cast upon the diffuser.

28. The backlight system of claim 27, in which the display is switched between a 2D mode and a 3D mode by changing the position of the lenticular lens between the first position and the second position, such that the display is in 2D mode when the lenticular lens is in the position in which diffuse illumination is cast upon the diffuser and in 3D mode the lenticular lens is in the position in which lines are focused on the diffuser.

29. The backlight system of claim 1, further comprising a plurality of sets of flashing lights between and parallel to the linear light emitting sources.

30. The backlight system of claim 1, in which the rectangular panel is larger than the LCD, such that the linear light emitting sources end beyond an active area of the LCD.

31. The backlight system of claim 30, further comprising a reflector on at least one wall of a housing enclosing the LCD and backlight.

32. The backlight system of claim 31, in which the reflector has a sawtooth cross section, with flat surfaces of each sawtooth being reflective and making an angle of 18.435 degrees with the wall of the housing, and an angle of 90 degrees to the direction of the linear light emitting sources.

33. The backlight system of claim 1, further comprising a sheet located between the rectangular panel and the image-forming LCD, having a first section which is diffuse and a second section which is transparent, each of the first section and second section being at least as large as the image-forming LCD, the sheet being movable from a diffuser position wherein the first section is between the rectangular panel and the image-forming LCD and a transparent position wherein second section is between the rectangular panel and the image-forming LCD.

34. The backlight system of claim 33, in which the display is switched from a 2D mode to a 3D mode by changing the position of the sheet from the diffuser position to the transparent position, such that the display is in 2D mode when the sheet is in the diffuser position and in 3D mode the sheet is in the transparent position.

35. The backlight system of claim 33, wherein the sheet is flexible and mounted on rollers on sides of the image-forming LCD, such that the sheet is moved between the diffuse position and the transparent position by being rolled from one roller to the other.

36. The backlight system of claim 33, in which the sheet is behind and close to the lenticular lens.

37. An LCD display producing a plurality of perspective views, comprising:
- a) an image-forming LCD having rows and columns and diagonal lines of pixel elements;
- b) a second LCD panel adjacent to the image-forming LCD, the second LCD panel being switchable from a clear transparent state to a patterned state comprising dark opaque linear areas and transparent areas between the opaque areas in the shape of slanted lines or stair step line segment patterns slanted at a slope angle relative to sides of the panel in a direction such that the transparent areas are parallel to diagonal lines of pixel elements in the image-forming LCD, producing a series of small light emitting lines with one line for every N diagonal lines of pixel elements, where N is the number of perspective views to be produced; and
- a backlight behind the image-forming LCD and the second LCD panel, shining light through the image-forming LCD and the second LCD panel.

38. The LCD display of claim 37, in which the second LCD panel is between the image-forming LCD and the backlight.

39. The LCD display of claim 37, in which the image-forming LCD is between the backlight and the second LCD panel.

40. The LCD display of claim 37 in which an apparent width of the transparent areas, as seen by an observer, is equal to a horizontal width and pitch of the pixel elements of the LCD.

* * * * *